United States Patent

[11] 3,576,506

[72] Inventors Robert L. Reynolds
Allentown;
Roger A. Sykes, Bethlehem, Pa.
[21] Appl. No. 723,676
[22] Filed Apr. 24, 1968
[45] Patented Apr. 27, 1971
[73] Assignee Bell Telephone Laboratories, Incorporated
Murray Hill, N.J.

[54] ENERGY TRANSLATING DEVICES
6 Claims, 15 Drawing Figs.

[52] U.S. Cl. .......... 333/72, 333/74, 310/9.5, 310/9.8
[51] Int. Cl. .......... H03h 9/00
[50] Field of Search .......... 333/70, 71, 72; 310/8.2, 8.6, 9.5, 9.2, 9.4, 9

[56] References Cited
UNITED STATES PATENTS

| | | | |
|---|---|---|---|
| 3,363,119 | 1/1968 | Koneval | 310/9.5 |
| 3,396,327 | 8/1968 | Nakazawa | 333/72 |
| 3,384,768 | 5/1968 | Shockley | 310/9.5 |
| 3,222,622 | 12/1965 | Curran | 333/72 |

OTHER REFERENCES

Onoe " Analysis of P.E. Resonators" Japan Electronics & Comm. #9 Sept. 1965 pp. 84—93, 333-72

*Primary Examiner*—Herman Karl Saalbach
*Assistant Examiner*—C. Baraff
*Attorneys*—R. J. Guenther and Edwin B. Cave

ABSTRACT: Monolithic crystal filters forming respective resonators from a crystal wafer and three or more electrode pairs which are sufficiently massive and spaced far enough so that the otherwise undisturbed coupling between one resonator and any other resonator is such that there exists a zero-impedance-resonance to zero-impedance-resonance frequency range less than one-third the smallest antiresonant-to-resonant frequency range of one of the two-coupled resonators, have at least one pair short circuited. The short-circuited pair is tuned by appropriate mass loading so that its observed minimum-impedance frequency corresponds to the desired midband frequency of the filter.

INVENTORS R.L. REYNOLDS
R.A. SYKES
BY
ATTORNEY

ENERGY TRANSLATING DEVICES

REFERENCE TO COPENDING RELATED APPLICATIONS

This application relates to the copending applications, Ser. No. 541,549, filed Apr. 11, 1966 now abandoned and Ser. No. 558,338, filed June 17, 1966, both of W. D. Beaver and R. A. Sykes and assigned to the assignee of the present invention.

BACKGROUND OF THE INVENTION

This invention relates to energy transfer devices particularly of the type disclosed in the before-identified applications of W. D. Beaver and R. A. Sykes, wherein selective low-loss transmission of energy between respective energy paths is achieved through acoustically resonant crystal wafers, by loading the opposite faces of one crystal wafer with the masses of a number of spaced electrode pairs that form resonators with the wafer and concentrate thickness shear vibrations between the electrodes of each pair, and by spacing the resonators on the single wafer so that predetermined portions of the vibrations of the one resonator affect the other.

The invention is also directed toward a specific aspect of the above applications, namely, a monolithic filter. According to that aspect a wave filter is formed by vapor depositing two pairs of electrodes on opposite faces of a piezoelectric quartz wafer and connecting one of the pairs to a source and the other to a load. In this environment the electrode pairs on the wafer form respective resonators. According to an aspect of the before-mentioned applications, the electrodes have sufficient mass and the pairs are spaced far enough apart so that the coupling between the resonators is small enough to confine the transmission characteristic to a preselected band and to confine its real image impedance characteristic to one impedance range less than a predetermined maximum over one frequency band, and to another impedance range greater than a predetermined minimum over a second frequency range.

The skirts of such filters were found to be controllable in steepness by further separating the resonators and depositing additional intermediate resonator-forming electrode pairs between them. Skirts are defined as the transition regions between the stop and passbands in the frequency versus insertion loss plot of the filter. While such intermediate resonators gave desirable effects it was found that the capacitance formed by the metallic electrodes of the intermediate pair affected the response of the filter. While this was not necessarily undesirable, it was also found that additional stray capacitances of leads and surrounding metallic environments also affected the characteristics by affecting the capacitance formed by the intermediate electrodes. As a result it was difficult to tune such filters for reliable transmission characteristics.

THE INVENTION

According to a feature of the invention, the objection to the operation of such crystal filters and other energy translating devices with more than two resonator-forming electrode pairs that have masses and are spaced for controlled coupling between them, are obviated by short circuiting the resonator-forming electrode pairs between the input and output electrode pairs.

These and other features of the invention are pointed out in the claims. Other objects and advantages of the invention will become obvious from the following detailed description when read in light of the accompanying drawings.

DESCRIPTION OF PREFERRED EMBODIMENTS

Figure 1:
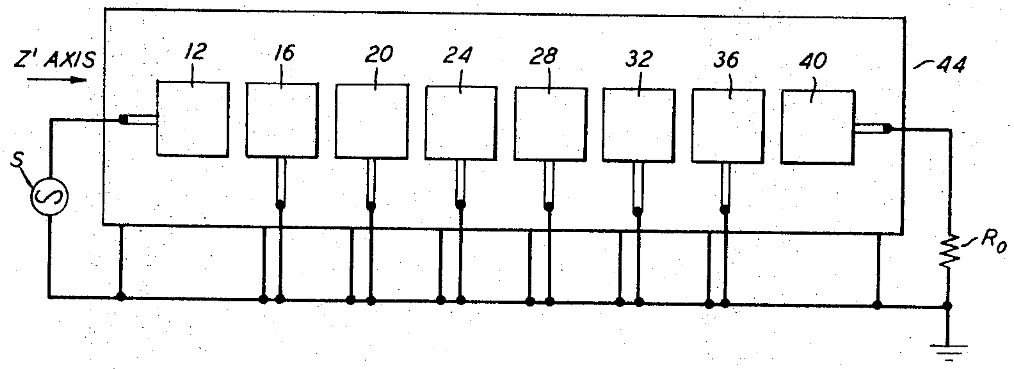
FIG. 1 is a partly schematic plan view of a filter embodying features of the invention.

In FIG. 1 eight pairs of electrodes 12, 14; 16, 18; 20, 22; 24, 26; 28, 30; 32, 34; 36, 38; and 40, 42 are vapor deposited, or plated, in alignment along the $Z'$ crystallographic axis on a rectangular AT-cut quartz crystal wafer or body 44. The thicknesses of the electrodes and wafer in FIG. 1 are exaggerated for clarity. The electrodes of each of the pairs oppose each other across the wafer. A source S applies a high frequency potential across the input electrodes 12 and 14, and piezoelectrically generates thickness shear vibrations in the crystal wafer 44. The vibrations excite vibrations in the crystal wafer between successive pairs of electrodes 12 to 42 and generate electrical energy in the electrodes 40 and 42. Each electrode pair, with the wafer, forms a resonator coupled to the adjacent resonators. A load resistor $R_o$ receives the electrical energy appearing across the output electrodes 40 and 42. The intermediate pairs of electrodes 16 through 38 are all short circuited to each other and grounded.

Figure 3:
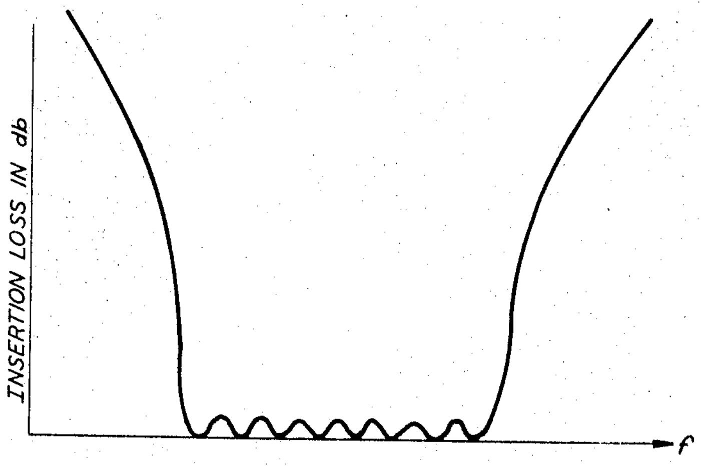
FIG. 3 is a graph illustrating the transmission characteristics of the device in FIGS. 1 and 2.

The masses of the electrodes 12 through 42 are sufficiently great so as to "trap" or concentrate the energy of vibrations in the wafer 44 to the volume of the wafer between the electrodes of each pair and attenuate the energy exponentially with the distance away from the pair. This limits the effect of the wafer boundaries upon vibrations within the wafer body. At the same time the spacing between the electrode pairs combined with the degree of mass loading is such as to couple the pairs to conform to a predesired passband within the bandwidth limits illustrated in FIG. 3.

Moreover, the masses and spacing are such that any two adjacent pairs of electrodes are in "definitively" coupled relation. This means that disregarding the effects of all other electrodes, the real image impedance, that is, the image resistance or the real portion of the characteristic impedance, exhibited by any two adjacent pairs as the frequency increases, forms two real impedance or resistance bands in respectively separate frequency ranges, in the first of which the real image impedance or resistance has an intermediate finite maximum between outer frequency limits of zero resistance, and in the second of which the impedance has an intermediate minimum between outer frequency limits of real infinite resistance. This effect is accomplished by making any two pairs of adjacent electrodes sufficiently massive and spaced sufficiently far apart so that the otherwise undisturbed coupling between them is such that there exists a frequency bandwidth from one zero-impedance-resonance to another zero-impedance-resonance (the coupling bandwidth) that is less than the smallest frequency range between the resonance and antiresonance of one of the two coupled pairs. In the preferred embodiment of FIG. 1 the effect is accentuated so that any two adjacent pairs of electrodes are coupled less than one-third of the maximum "definitive" coupling. That is to say, they are sufficiently massive and spaced far enough apart that the otherwise undisturbed coupling between them is such that the coupling bandwidth (i.e., the zero-impedance-resonant-to-resonant frequency bandwidth) is less than one-third the smallest resonant-to-antiresonant range of one of the coupled resonators.

Figure 4:
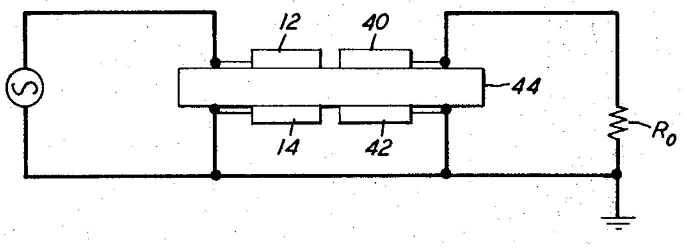
FIG. 4 is a schematic diagram of a filter corresponding to that of FIGS. 1 and 2 but having only two electrode pairs.
Figure 5:
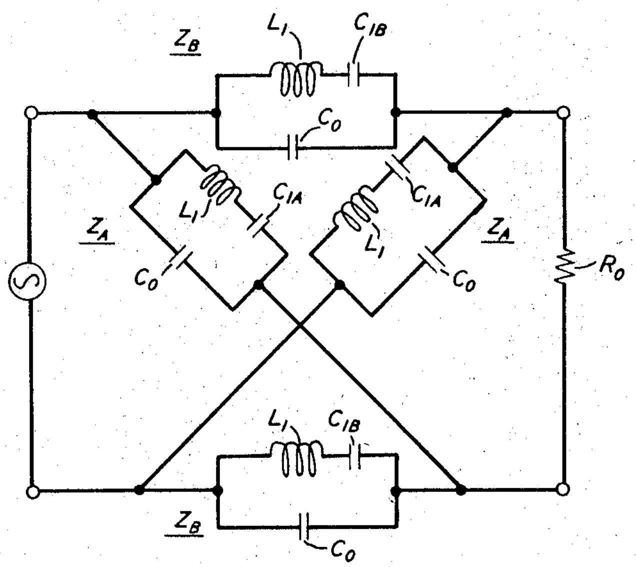
FIG. 5 is the lattice equivalent circuit for the filter of FIG. 4 corresponding to that of FIGS. 1 and 2 but having only two pairs of electrodes.

The effects of having only two such electrode pairs can be considered by looking at such a two-resonator filter, a source S and a load resistor $R_o$ as shown in FIG. 4 and at the lattice electrical equivalent circuit of FIG. 4 shown in FIG. 5. The equivalent circuit of FIG. 5 illustrates electrically the effect of coupling two resonators on filters having only two coupled resonators. Here the capacitors $C_{1A}$ and $C_{1B}$ control the resonant frequencies of $Z_A$ and $Z_B$, and vary with the coupling. When uncoupled $C_{1A}=C_{1B}$. The tighter the coupling the larger $C_{1A}$ and the smaller $C_{1B}$. In FIG. 5 the filter's characteristic impedance or image impedance $Z_i=\sqrt{Z_{oc}Z_{sc}}$, where $Z_{oc}$ and $Z_{sc}$ are respectively the impedances when the load is open circuited and short circuited. For the lattice structure of FIG. 5, $Z_i=\sqrt{Z_AZ_B}$. Since the crystal body 44 has a large Q, the values of $Z_A$ and $Z_B$ are almost exclusively comprised of their reactances $X_A$ and $X_B$. Thus, the image impedance $Z_i$ is equal to $\sqrt{X_AX_B}$.

Figure 6:
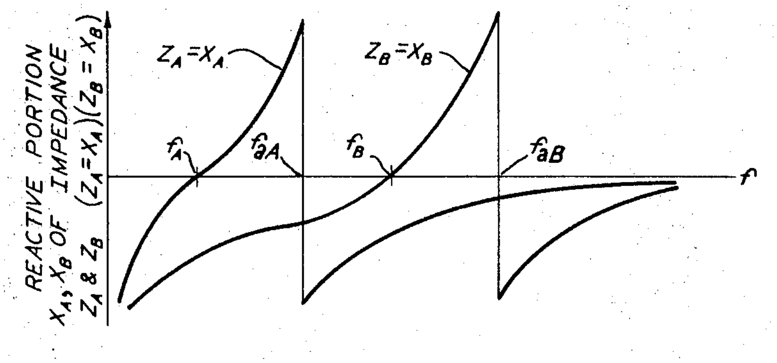
FIG. 6 is a graph illustrating the variation of reactive impedance, i.e., reactance, with frequency for the component resonant circuit in FIG. 5 when the electrodes of FIG. 4 have substantially no masses and are spaced to be tightly coupled.

In crystal structures which are not mass-loaded by the electrodes, vibrations produced by the source S excite wide areas of the crystal body. The coupling is then much tighter than with mass-loaded electrodes. With very tight coupling the reactances $X_A$ and $X_B$ then vary with frequency as shown in FIG. 6.

Figure 7:
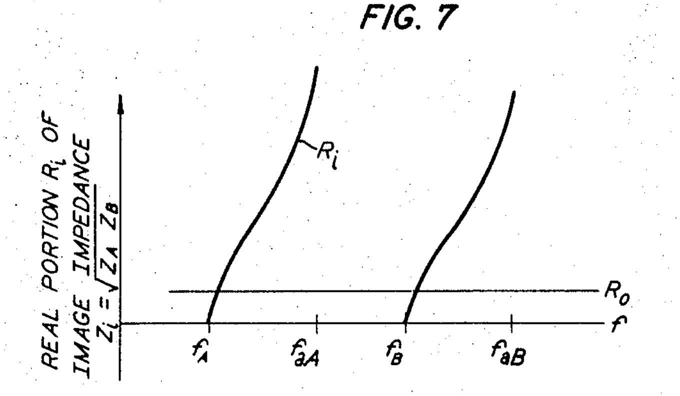
FIG. 7 is a graph illustrating the real image impedance, i.e., image resistance, or real characteristic impedance of the circuit in FIG. 4 for the conditions of FIG. 6.
Figure 8:
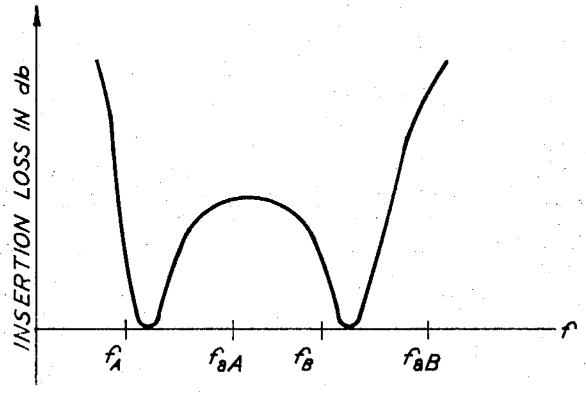
FIG. 8 is a graph illustrating the transmission characteristic for the circuits of FIGS. 4 and 5 under the conditions of FIGS. 6 and 7 when terminated with a fixed value of resistance.

Since $X_A$ and $X_B$ are imaginary numbers, that is, they are equal to $jX'_A$ and $jX'_B$, their product is negative if they carry a like sign, but positive if they bear opposite signs. Only the square root of a positive number is real. Thus, only in the frequency regions in which $X_A$ and $X_B$ appear on opposite sides of the abscissa does the filter exhibit image impedances $Z_i$ which are positive and real. This real positive image impedance is the image resistance $R_i$. As shown by the curves of the real portion of $Z_i$ in FIG. 7, two real positive image impedances or resistances $R_i$ exist for the tight coupling of FIG. 6. They extend respectively across the lower resonant-to-antiresonant range $f_A$ to $f_{aA}$ and the upper resonant-to-antiresonant range $f_B$ to $f_{aB}$ of the resonators represented by the individual impedances $Z_A$ and $Z_B$. Since the insertion loss is minimum when the terminating resistance $R_T$ matches the real characteristic or real image impedance $R_i$, the insertion loss for such a device is very high in the reactive image impedance region $f_{aA}$ to $f_B$. It is low only near the two frequencies where $R_T$ crosses $R_i$. For low load resistances, the curves of FIG. 6 produce the insertion loss or transmission characteristic shown in FIG. 8.

According to the copending applications mentioned before, giving the electrodes sufficient masses concentrates the thickness shear mode vibration energy in the wafer 44 between the electrodes of the respective pairs so that the crystal body 44 vibrates with exponentially diminishing amplitude outside the volume between the electrodes. The coupling between the resonators thus decreases. Significant energy is not permitted to reach the boundaries of the body. Such mass loading of the electrodes produces two resonators when two pairs of electrodes are used. When these two resonators are placed in each other's effective field, they operate similar to a double-tuned transformer.

Figure 9:
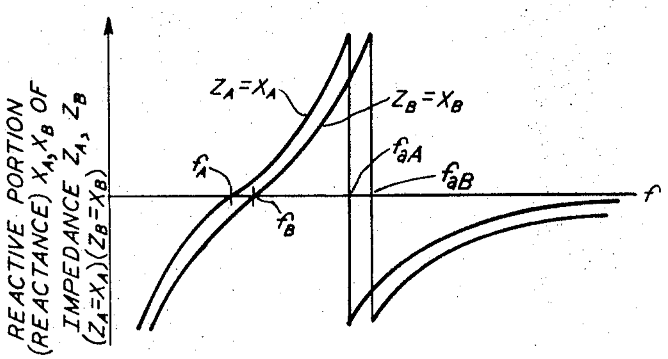
FIG. 9 is a graph illustrating the variation in component reactance in the circuit of FIG. 5 when the electrodes of FIG. 4 are given masses and spaced to result in less coupling.
Figure 10:
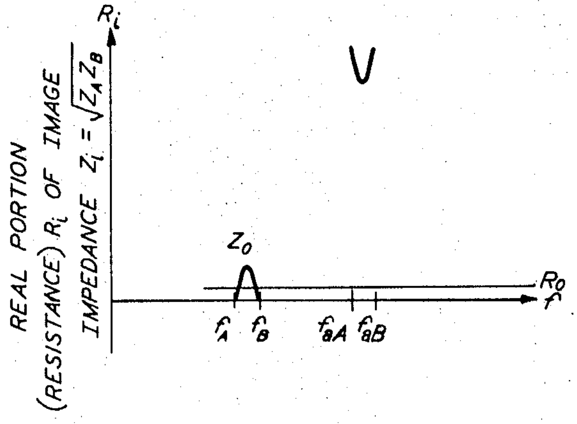
FIG. 10 is a graph illustrating the variations in the real part of the characteristic impedance, i.e., variations in image resistance of the circuit in FIGS. 4 and 5 in the two passband region for the conditions of FIG. 9.

Increasing the distances between the electrode pairs and increasing the masses of the electrode pairs reduces the coupling between resonators. When this happens the resonant frequency $f_A$ and $f_B$ approach each other. When the coupling is low enough so that $f_B$ is lower than $f_{aA}$ the individual reactance curves $X_A$ and $X_B$ appear as shown in FIG. 9. There, the resonant-to-antiresonant ranges overlap. Thus $f_B-f_A$ is less than $f_{aA}-a8A$. The resulting real image impedances $Z_i$, that is $R_i$, appear in the real plane of FIG. 10. As shown in FIG. 10 the resistance $R_i$ possesses two positive real ranges. One range extends between the resonant frequencies and has an intermediate maximum with zero extremes. A second range lies between $f_{aA}$ and $f_{aB}$. There $R_i$ starts an infinity, drops and returns to infinity as the frequency rises. One of two frequency ranges can be rejected by terminating the electrode within the resistance range of one resistance $R_i$ but remote from the other. Since in FIG. 10, $R_L$ closely matches the image resistance within the lower range, the system passes the frequencies between $f_A$ and $f_B$ with little loss. A curve showing the insertion loss for a filter exhibiting these conditions and loaded with a resistance $R_L$ appears in FIG. 11.

Figure 11:
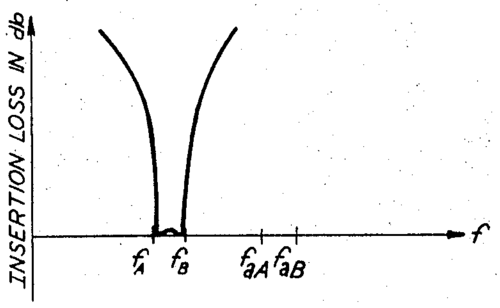
FIG. 11 is a graph illustrating the transmission characteristic of the circuits in FIGS. 4 and 5 for conditions of FIGS. 9 and 10 when terminated with a fixed resistance proper for the low band.

The conditions of FIGS. 9, 10 and 11 can be ascertained by applying a driving voltage with a source impedance to one pair of electrodes and short circuiting the other in a two-pair monolithic filter. The input voltage to the driven pair is then noted. The frequencies at which the noted input voltage is lowest is then measured. This represents the frequencies $f_A$ and $f_B$. If $f_B-f_A$, that is the coupling bandwidth or bandwidth from one zero-impedance-resonance to another, is less than $f_{aA}-a8A$, the antiresonant-to-resonant frequency range of either one of the two coupled resonators, then the conditions of FIGS. 9, 10 and 11 exist. This is the condition herein described as the "definitive" coupling condition. The resonators or electrode pairs are thus "definitively" coupled. If $f_B-f_A$ exceeds or is equal to $f_{aA}-f_A$, conditions of FIGS. 6, 7 and 8 exist. The coupling coefficient $k$ between these pairs is equal to $(f_B-f_A)/\sqrt{f_Af_B}$.

For practical purposes in order to make the maximum impedance value between $f_B$ and $f_A$ much smaller than the minimum impedance value between $f_{aB}-f_{aA}$, the value of $f_B-f_A$ is generally below both $(f_{aB}-f_B)/3$ and $(f_{aA}-f_A)/3$. This assures adequate rejection of one band and passage of the other with suitable terminating values of resistance $R_T$.

Figure 2:
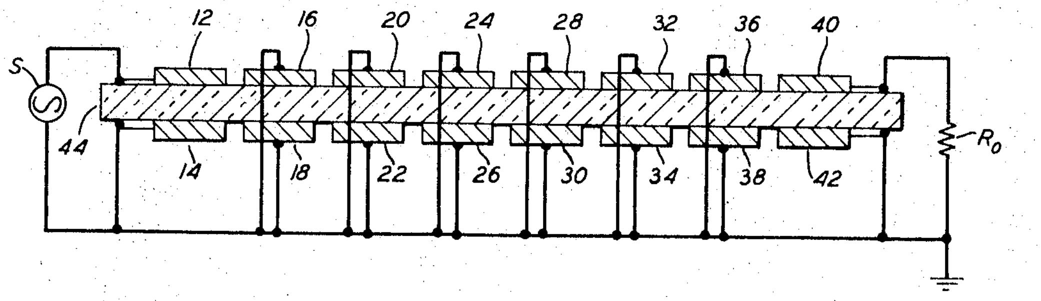
FIG. 2 is a partly schematic sectional view of the filter in FIG. 1.

In FIGS. 1 and 2 adjacent pairs of electrodes considered alone are also in the heretofore defined "definitive" coupling condition. That is they follow the rule illustrated in FIGS. 9, 10 and 11. These conditions can be ascertained as to any two adjacent pairs by applying a variable frequency driving voltage to one of the adjacent pairs, short circuiting the other adjacent pair, and leaving the remaining pairs open circuited. An example of an applicable arrangement for testing the coupling between two adjacent pairs appears in FIG. 12. Here a variable frequency test source 60 is applied to the electrodes 20 and 22 and the electrodes 24 and 26 are short circuited. The remaining electrode pairs are open circuited. The voltage applied at electrodes 20 and 22 is noted by a meter 62. The applied frequency from the source 60 is measured at the two lowest voltages noted by the meter 62 as the frequency output of source 60 is varied. These two measured frequencies constitute the frequencies $f_A$ and $f_B$. In FIG. 1, $f_B-f_A$ is less than $f_{aA}-a8A$ or $f_{aB}-f_B$. Thus the two pairs are in definitive coupling condition.

The remaining electrodes fail to affect these measurements appreciably because the capacitance $C_o$ of the metal electrodes shift the frequencies of these pairs far enough away from the spectrum of $f_B-f_A$ to avoid significant interference. If necessary, additional inductance may be connected across these remaining electrodes 12 to 18 and 28 to 42, to shift their frequencies further away from the range of $f_B-f_A$.

An example of the dimensions suitable for the structure of FIGS. 1 and 2 follows. These dimensions are only examples and should not be taken as limiting. According to this example, the crystal body is composed of an AT-cut quartz crystal 1.370 inches long, 0.440 inches wide and approximately 0.007806 inches thick. The dimensions of the electrode pairs 12 through 42 are 0.0970 inches along the long direction of the crystal body, that is along the Z′ axis by 0.122 inches across the Z′ axis. The electrode separations $d_1$ to $d_7$ between the edges having the long dimensions are:

$d_1$=inches $d_2$=inches $d_3$=inches $d_4$=inches $d_5$=inches $d_6$=inches $d_7$=inches These spacing dimensions have tolerances of ±0.0001 inches, respectively. The masses of the electrodes are such as to achieve respective platebacks of 3.0 percent. The term "-plateback" is defined in the beforementioned copending applications and represents a measure of the masses or the effects of the masses of the electrodes. Specifically, plateback constitutes the fractional drop $(f-f_r)/f$ in the resonant frequency $f_r$ of a crystal body electroded with a single pair of electrodes, from the fundamental thickness shear frequency $f$ of the unelectroded crystal body, due to increasing masses of the electrodes. This takes into account the fact that as the masses of the electrodes are increased, the resonant frequency of the individual resonator, as measured with other resonators detuned, is lowered.

The resulting respective normalized coupling coefficients $k$ between successive pairs from left to right in FIGS. 1 and 2 are 0.7277, 0.5451, 0.51560, 0.5101, 0.5160, 0.5451 and 0.7277. The structure of FIGS. 1 and 2 passes a midband frequency of 8.141830 MHz. and has a passband width of about 3.20 kHz. The resonator inductance is 44.2 millihenries and the resonator Q is about 160,000 to obtain good passband shaping. The source S has a resistance of 736 ohms and the output of the electrodes 40 and 42 is applied across the resistive load $R_o$ of 736 ohms.

By virtue of the electrodes being tuned, while short circuited, to the center of the desired band substantially only those frequencies associated with the low impedance are passed to the successive pairs of electrodes. Successive resonators formed by each pair of electrodes, all short circuited, operate similarly until the last pair of electrodes apply the voltages to the load of $R_o$.

Figure 12:
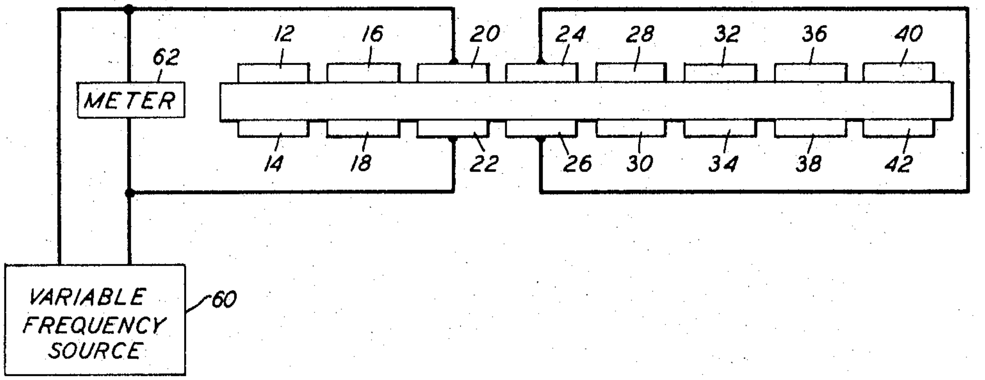
FIG. 12 is a schematic diagram illustrating a test procedure for measuring the coupling between the resonators formed by the electrode pairs in FIGS. 1 and 2.

In the process of determining the coupling between adjacent pairs as shown in FIG. 12, it is the capacitances $C_o$ of the open-circuited pairs that detune them sufficiently not to disturb the measurement of $f_A$ and $f_B$. If for any reason the detuning due to the open-circuit condition is not sufficient, an inductor is connected across the electrodes whose coupling is not being measured to tune them out or antiresonate $C_o$.

In operation, the source S applies an alternating voltage to the electrodes 12 and 14. These electrodes piezoelectrically generate acoustical energy in the crystal wafer between them. By virtue of their mass loading which produces the plateback these electrodes "trap" much of the energy of the vibrations within the crystal body 44 in the volume between the electrodes and away from the edges of the body 44. However, the vibrations between the first pair of electrodes successively spread into the acoustical range of the subsequent pairs of electrodes and excite within the regions between these electrodes vibrations of the same frequency. The vibrations in the last pair of electrodes piezoelectrically generate an electrical output that appears across the load.

The terms "thickness shear vibrations" or "thickness shear mode" are used in the sense indicated in the McGraw-Hill Encyclopedia of Science and Technology, published by McGraw-Hill Book Company of New York, 1966, Volume 10, pages 220, 221 and 222 and embrace the vibrations in which the opposing faces vibrate along their planes in opposite directions, and includes the vibrations in which the portions of the same face vibrate in phase as well as vibrations in which portions of the same face vibrate out of phase or oppositely. The latter form of the thickness shear mode is sometimes called the thickness twist mode. It occurs when on an AT-cut quartz crystal, the electrodes are aligned in the Z′ direction. The in-phase condition occurs when on that crystal they are aligned in the X direction. Thickness shear vibrations and thickness shear mode also refer to vibrations that occur when the electrodes on the exemplary AT-cut crystal are aligned in directions between the X and Z′ directions.

Figure 13:
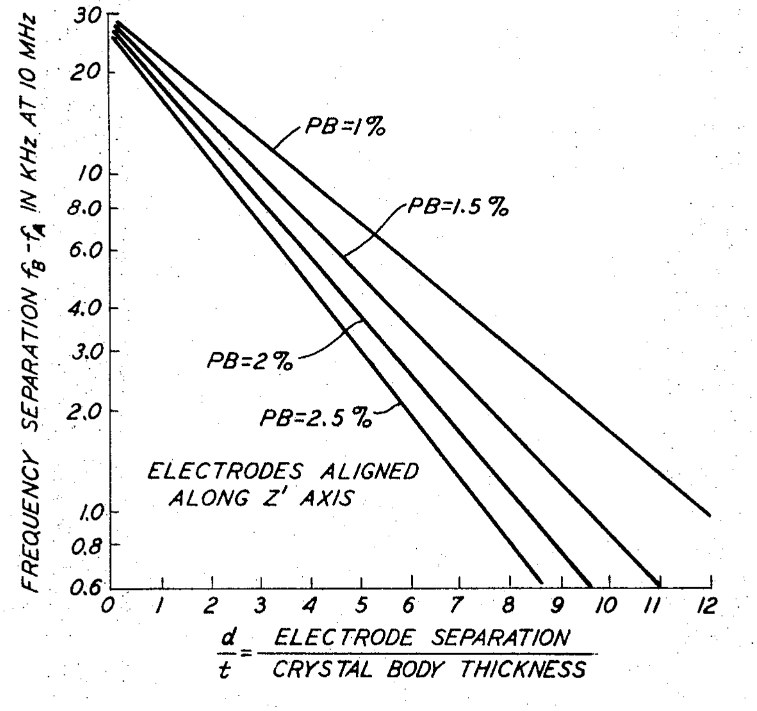
FIGS. 13, 14 and 15 are graphs illustrating parameter relations for helping determine the dimensions of the filter array in FIGS. 1 and 2.
Figure 14:
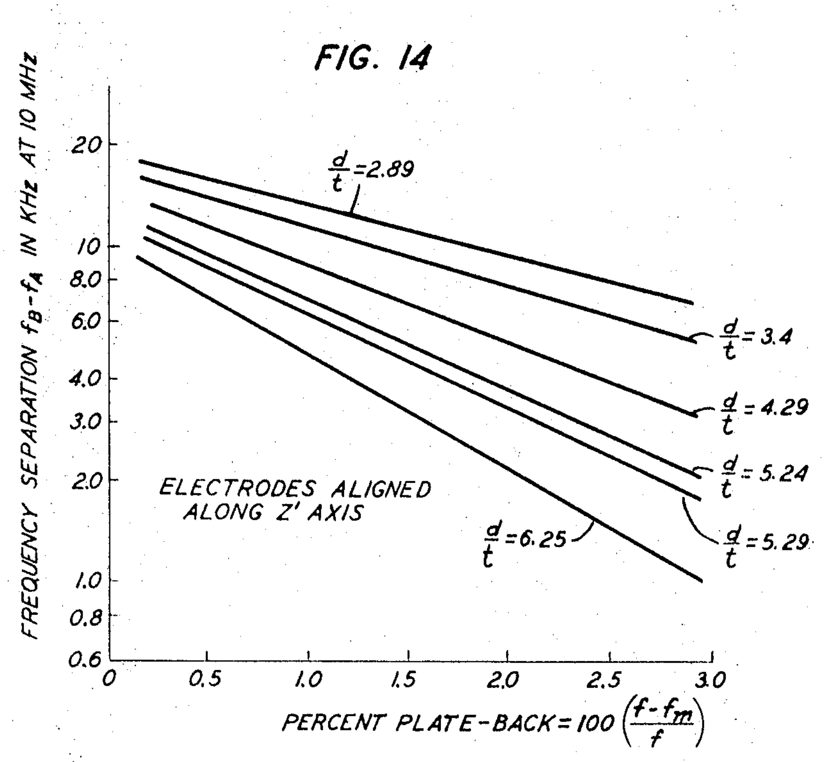
Figure 15:
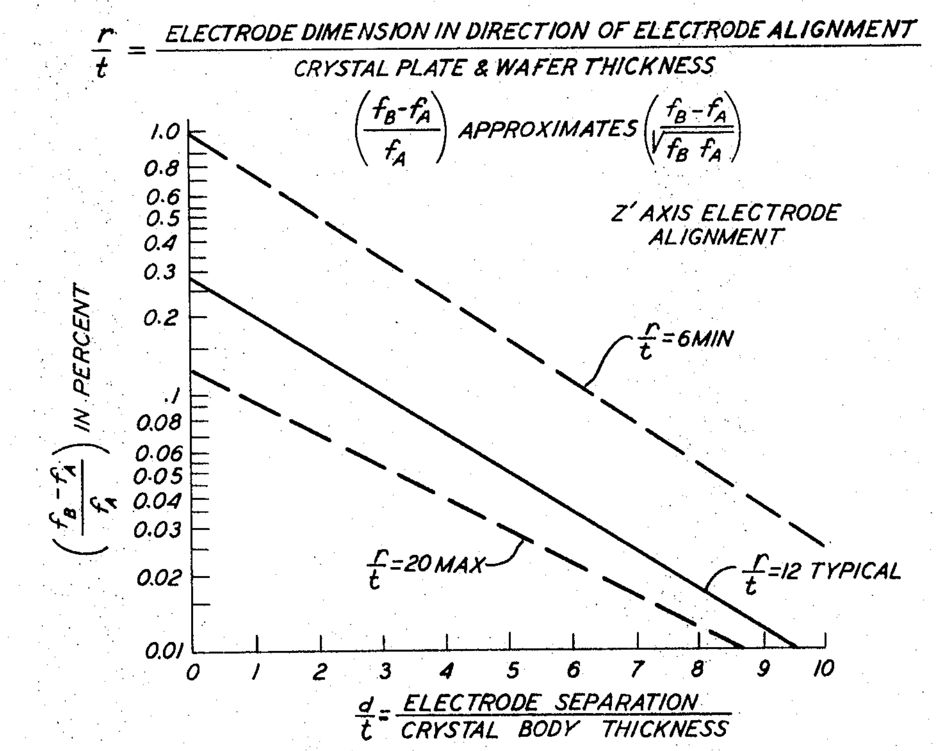

An example of curves that have been developed for structures such as that of FIG. 4 operating in the fundamental thickness shear mode and useful for constructing the crystal structure are shown in FIGS. 13, 14 and 15.

The crystal structure of FIGS. 1 and 2 is manufactured by first selecting total bandwidth Bw and calculating on the basis of ordinary circuit theory the coupling coefficients $(f_B-f_A)/\sqrt{f_A f_B}$ between each pair of electrodes. Electrode sizes and a suitable plateback (from 0.3 to 3 percent), is chosen from curves such as in FIGS. 13, 14 and 15. Where $t$ is the wafer thickness and $r$ the width of the electrodes $r/t$ is generally made equal to 12 although in practice any value between 6 and 20 is usable. A value of $15t$ is frequently chosen as the length of the electrodes normal to the coupling axis for good suppression of other modes. The fundamental thickness shear mode frequency $f$ is determined to correspond to the chosen plateback $P_B$ by making the desired midband frequency $f_m=f_r$. Hence $$P_B=\frac{f-f_r}{f}=\frac{f-f_m}{f}$$

$$f=\frac{f_m}{1-P_B}$$

The manufacture starts by first cutting a wafer 16 from a quartz crystal having the desired crystallographic orientation such as an AT-cut. The wafer is then lapped and etched to a thickness $t$ corresponding to the desired fundamental shear mode, either parallel or twist, index frequency $f$. Generally, the thickness is inversely proportional to the desired frequency. Masks with cutouts placed on each face of the crystal wafer serve for depositing the electrodes. The geometry of the electrodes is determined by considering the desired bandwidths and the convenient plateback.

The proper separation $d$ between the electrodes may be determined from graphs such as those of FIGS. 13, 14 or 15 which show variations in coupling for various ratios of electrode separation to wafer thickness and for various platebacks, as well as various values of $r/t$ at one center frequency.

To obtain the chosen platebacks, gold or nickel is deposited such as by evaporation in layers through the masks so as to make connections possible and achieve nearly the total desired plateback. Energy is applied separately to each pair of electrodes and mass added to the electrodes until a shift corresponding to the desired total plateback occurs. This is done until the pair resonates at the frequency $f_m$. During this depositing procedure the other electrode pairs are detuned by keeping them open circuited. However, it may be necessary to obviate the effect of the other pairs by terminating them inductively. The intermediate electrodes are then short circuited. The coupling and responses of each pair of coupled resonators are then measured and the desired bandwidths should prevail. Adjustments may be made by slight variation in the plateback of each pair of electrodes.

The invention furnishes a reliable energy translating system and filter which can be constructed on only one crystal in small sizes.

While embodiments of the invention have been described in detail, it will be obvious to those skilled in the art that the invention may be embodied otherwise without departing from its spirit and scope.

We claim:

1. An acoustical device for translating a selected energy band and imparting it to an energy carrier of selected load characteristics comprising, a piezoelectric body having opposite faces and cut for operation in a thickness shear mode when excited over a frequency range, first electrode means on said body, second electrode means on said body, third electrode means on said body, said third electrode means being spaced from the other two of said electrode means whereby said third electrode means are acoustically coupled to each of said other electrode means, each of said electrode means having sufficient masses and being spaced sufficiently far from the electrode means to which it is coupled so that considering only said two-coupled electrode means there exists a real-image-impedance-frequency characteristic having a continuous portion starting at a zero value increasing to a maximum value and decreasing to zero value within a confined impedance range, said third electrode means having a short-circuited pair of opposing electrodes on opposite faces of said body, each of said electrode means including a pair of electrodes on opposite faces of said body, said short-circuited one of said electrode means including a plurality of electrode pairs each on opposite faces of said body and each of said pairs being short circuited.

2. An acoustical device for translating a selected energy band and imparting it to an energy carrier of selected load characteristics comprising, a piezoelectric body having opposite faces and cut for operation in a thickness shear mode when excited over a frequency range, first electrode means on said body, second electrode means on said body, third electrode means on said body, said third electrode means being spaced from the other two of said electrode means whereby said third electrode means are acoustically coupled to each of said other electrode means, each of said electrode means having sufficient masses and being spaced sufficiently far from the electrode means to which it is coupled so that considering only said two-coupled electrode means there exists a real-image-impedance-frequency characteristic having a continuous portion starting at a zero value increasing to a maximum value and decreasing to zero value within a confined impedance range, said third electrode means having a short-circuited pair of opposing electrodes on opposite faces of said body, all of said pairs having sufficient masses and being spaced at such a distance from each other so as to be coupled to adjacent ones of said pairs with the same degree of coupling as exists between the coupled ones of said electrode means.

3. An acoustical device for translating a selected energy band and imparting it to an energy carrier of selected load characteristics comprising, a piezoelectric body having opposite faces and cut for operation in a thickness shear mode when excited over a frequency range, first electrode means on said body, second electrode means on said body, third electrode means on said body, said third electrode means being spaced from the other two of said electrode means whereby said third electrode means are acoustically coupled to each of said other electrode means, each of said electrode means having sufficient masses and being spaced sufficiently far from the electrode means to which it is coupled so that considering only said two-coupled electrode means there exists a real-image-impedance-frequency characteristic having a continuous portion starting at a zero value increasing to a maximum value and decreasing to zero value within a confined impedance range, said third electrode means having a short-circuited pair of opposing electrodes on opposite faces of said body, said third electrode means being a part of a plurality of pairs of electrodes all on opposing faces of said body and all having their respective electrodes short circuited.

4. An acoustical device for translating a selected energy band and imparting it to an energy carrier of selected load characteristics comprising, a piezoelectric body having opposite faces and cut for operation in a thickness shear mode when excited over a frequency range, first electrode means on said body, second electrode means on said body, third electrode means on said body, said third electrode means being spaced from the other two of said electrode means whereby said third electrode means are acoustically coupled to each of said other electrode means, each of said electrode means having sufficient masses and being spaced sufficiently far from the electrode means to which it is coupled so that considering only said two-coupled electrode means there exists a real-image-impedance-frequency characteristic having a continuous portion starting at a zero value increasing to a maximum value and decreasing to zero value within a confined impedance range, said third electrode means having a short-circuited pair of opposing electrodes on opposite faces of said body, each of said electrode means including a pair of electrodes on opposite faces of said body, said short-circuited one of said electrode means including a plurality of electrode pairs, each on opposite faces on said body and each of said pairs being short circuited, said pairs having sufficient masses and being spaced from each other so as to be coupled to adjacent ones thereof with the same degree of coupling as exists between the coupled ones of said electrode means, said plurality of pairs of electrode means and said first and second pairs of electrode means being aligned along one axis of said body.

5. An acoustical device for translating a selected energy band and imparting it to an energy carrier of selected load characteristics comprising, a crystal body having opposite faces and cut for operation in a thickness shear mode, first electrode means on opposite faces of the crystal body, second electrode means on opposite faces of the crystal body, third electrode means on opposite faces of the crystal body, said electrode means being spaced from each other, said third electrode means being acoustically coupled to each of said other electrode means, said electrode means each having sufficient masses and being spaced sufficiently far from each other such that the coupling only between one electrode means and one other is such that there exists a zero-impedance-resonance to zero-impedance-resonance frequency bandwidth less than the antiresonant-to-resonant frequency range of either of the coupled electrode means, said electrode means having a short-circuited pair of electrodes on opposite faces of said body connected to the other.

6. An acoustical device for translating a selected energy band and imparting it to an energy carrier of selected load characteristics comprising, a piezoelectric body having opposite faces and cut for operation in a thickness shear mode, first electrode means on opposite faces of said body, second electrode means on opposite faces of said body, third electrode means on opposite faces of said body, said electrode means being spaced from each other, said third electrode means being acoustically coupled to each of said other electrode means, said electrode means each having sufficient masses and being spaced sufficiently far from each other such that the coupling only between one electrode means and one other is such that there exists a zero-impedance-resonance to zero-impedance-resonance frequency bandwidth less than the antiresonant-to-resonant frequency range of either of the coupled electrode means, said electrode means having a short-circuited pair of electrodes on opposite faces of said body connected to the other, said electrode means having sufficient mass and being spaced so that the otherwise undisturbed coupling only between one electrode means and any other electrode means is such that there exists a zero-impedance-resonance to zero-impedance-resonance frequency bandwidth less than one-third the antiresonant-to-resonant frequency range of either of the coupled electrode means.